Dec. 16, 1969  W. D. REECE ET AL  3,484,802
COTTON HARVESTER

Filed Jan. 29, 1968  2 Sheets-Sheet 1

INVENTORS
W.D. REECE &
R.K. LEONARD
BY William A. Morray
ATTORNEY

Dec. 16, 1969    W. D. REECE ET AL    3,484,802
COTTON HARVESTER
Filed Jan. 29, 1968    2 Sheets-Sheet 2

INVENTORS
W. D. REECE &
R. K. LEONARD
BY William A. Murray
ATTORNEY

United States Patent Office 3,484,802
Patented Dec. 16, 1969

3,484,802
COTTON HARVESTER
Wendell Dale Reece, Ankeny, and Ronald Keith Leonard, Madrid, Iowa, assignors to Deere & Company, Moline, Ill., a corporation of Delaware
Filed Jan. 29, 1968, Ser. No. 701,286
Int. Cl. A01d 45/20
U.S. Cl. 56—12                                                      15 Claims

ABSTRACT OF THE DISCLOSURE

A cotton harvesting implement composed of a tractor; a plurality of transversely spaced cotton harvester units pivotally supported for vertical movement on the tractor and forwardly thereof, each of the units having a conveyance means for moving cotton rearwardly to a rear discharge end; transverse conveying means supported on the tractor rearwardly of the units and composed of a first transverse conveyor positioned to receive cotton from the harvester units and to move the cotton to outer ends, and a second transverse conveyor adapted to receive the cotton from the outer ends of the first conveyor and to move the cotton inwardly to a central position relative to the tractor; the first and second conveyor including augers and auger troughs that are grilled to permit trash to discharge as the augers shift the cotton in the respective directions; and blower ducts positioned to receive cotton from the transverse conveyor and to move cotton upwardly to upper discharge ends discharging into a cotton container.

BACKGROUND OF THE INVENTION

This invention relates to a row crop harvester and particularly to a row crop harvester utilized in harvesting cotton. Still more particularly the invention relates to a cotton harvester having a plurality of row harvesting units positioned forwardly of a transverse conveyor structure, part of which moves the harvested cotton transversely to outer ends and part of which then moves the harvested cotton inwardly to a central conveyor. The transverse conveyor means are of the auger type and the auger trough are grilled to permit trash to be discharged.

It has heretofore been known to provide crop harvesters in series of four-row units or more that is positioned forwardly of a transverse conveyor structure. In a pending application, Ser. No. 562,416, filed June 8, 1966, and assigned to the present assignee, there is shown and described a crop harvester supported on a mobile vehicle having a transverse auger structure extending the expanse of four full rows of crop. Positioned and supported on the transverse conveyor structure are four-row units that harvest four adjacent rows of crop. The individual row units are supported on the transverse auger structure with at least two of the units being pivotally supported on the structure and controlled by hydraulic motors so that the units may be raised and lowered.

In harvesting some crops, such as cotton, it is necessary to provide a cleaning mechanism which will separate trash from the cotton prior to its being moved into a retainer or collecting box. In the crop harvester as shown and described in the previously mentioned application, the crop, following its being harvested, is merely moved inwardly into a fore-and-aft conveyor which moves it into the vehicle on which it is mounted. Thus, no cleaning or separating of the trash occurs.

SUMMARY OF THE INVENTION

With the above in mind, it is the primary purpose of the present invention to provide a crop harvester of the cotton harvesting type that includes a plurality of crop harvesting units transversely spaced along a forwardly positioned transverse auger structure. The auger structure is composed of two parts, the first being a part that is positioned directly rearwardly of the respective row units so as to receive and move the entire crop to an outer end beyond the transverse expanse of the traction wheels to be transferred to the second part which is a transverse conveyor that moves the cotton inwardly to a central fore-and-aft extending conveyor.

The floor structure in the auger conveyors are grilled so that the cotton is conveyed a relatively long distance over the grille structure and is received in the fore-and-aft conveyor in a relatively clean condition.

DESCRIPTION OF THE PREFERRED EMBODIMENT

Figure 2:
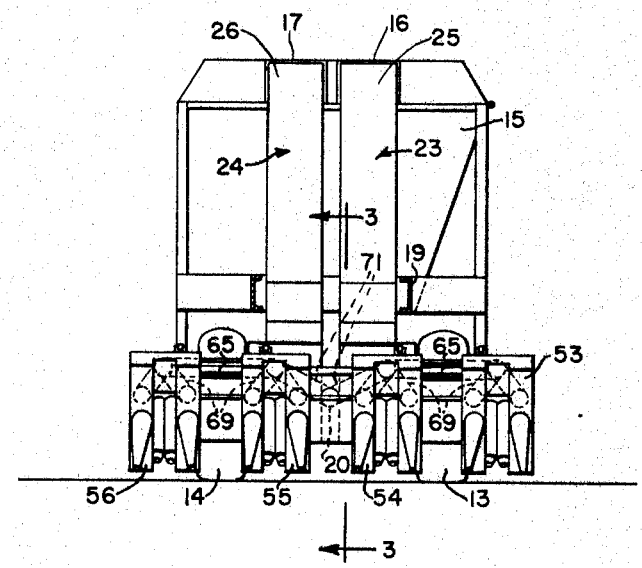
FIG. 2 is a front view of the cotton harvester with the operator's platform removed and is taken substantially along the line 2—2 of FIG. 1.

The cotton harvester is composed of a main traction vehicle or tractor 10 having a main elongated frame 11 supported on rear steerable wheels 12 and a pair of front traction wheels 13, 14. The traction wheels are spaced transversely apart sufficiently to permit a pair of adjacent rows of cotton plants to pass between them. Supported on the traction frame 11 and substantially the full length of the tractor 10 is a cotton picker basket or container 15 in which cotton may be blown or discharged as it is harvested. The basket 15 has a pair of forwardly opening and adjacent cotton inlets 16, 17 at its forward upper portion. An operator's station 18 is provided forwardly of the basket 15 and is carried on a horizontal structural platform 19 cantilevered forwardly from the frame 11. The tractor 10 has a power train terminating in a forwardly extending power take-off shaft, not shown, but indicated by the location of a central pulley 20 (FIG. 2) which drives other portions of the cotton harvester. Also provided on the tractor 10 is a pair of transversely spaced apart blowers or fans 21 which move air through horizontal ducts 22 first under the axle of the traction wheels 13, 14 and then upwardly into a pair of cotton discharge ducts 23, 24 having upper discharge ends 25, 26 directed rearwardly into the respective openings 16, 17 of the cotton basket 15. Reviewing FIG. 2, it becomes apparent that the ducts 23, 24, the blowers 21 and blower ducts 22 are offset slightly to opposite sides of the fore-and-aft center line of the entire implement. As will later become apparent, the blower 21, duct 22 and discharge duct 24 on the right side of the implement serves as the conveying mechanism for the row units on the right side of the implement and the blower 21, blower duct 22 and discharge duct 23 serves as the conveying mechanism for the row units on the left side of the implement.

Figures 3, 4:
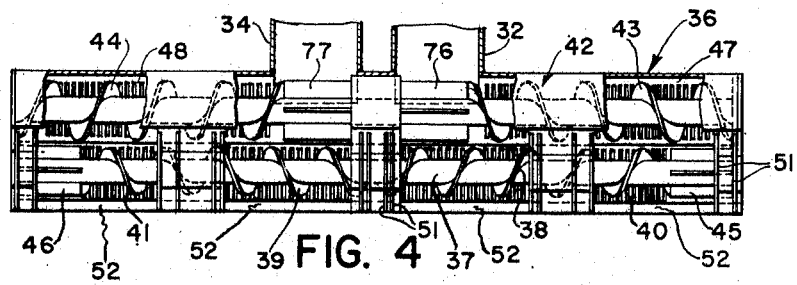
FIG. 3 is a large sectional view taken substantially along the line 3—3 of FIG. 2.
FIG. 4 is a plan view of the transverse conveyor structure with portions of the housing removed to show internal mechanism.

Reviewing FIG. 3, the blower duct 22 has a vertical portion 30 directed upwardly into the main portion of the cotton discharge duct 23. The lower portion of the duct 23 is offset forwardly, as at 31, and has a forwardly opening inlet means 32. The right-hand duct 24 has a similar arrangement with a forwardly opening inlet means 34. The undersides of the inlet portions 32, 34 of the ducts 23 are suspended on the main frame 11 of the tractor by suitable bracket means as at 35 (FIG. 3).

Affixed to the forward inlet portions 32, 34 is a transverse conveyor structure 36. The conveyor structure 36 is composed of a first or front auger conveyor 37 composed of transversely aligned augers 38, 39 and housings 40, 41 that extends outwardly from adjacent ends at the center of the tractor to outer ends that project beyond the transverse expanse of the respective traction wheels 13, 14. Provided rearwardly of the front auger 37 is a second or rear transverse auger structure 42 that is parallel and closely adjacent to the front conveyor structure 37. The rear or second auger structure 42 is composed of a pair of transversely aligned augers 43, 44 extending from outer ends just rearwardly of the outer ends of the front augers 38, 39 inwardly to a central discharge area forwardly of the respective inlet openings 32, 34. Transfer means in the form of paddle or blade structures 45, 46 at the ends of the respective augers 38, 39 is utilized to move material rearwardly from the front augers 38, 39 to the outer ends of the rear augers 43, 44. The rear augers 43, 44 are supported in troughs 47, 48 that are grilled to permit trash to flow out of the housing. The forward auger troughs 40, 41 are also grilled for the same purpose. The conveyor structure 36 is provided with upper or overhead panels 50 that close the upper sides of the auger housing.

Affixed to and projecting upwardly from the panel structure 50 and particularly over the forward augers 38, 39 are upright fore-and-aft extending brackets 51 that are disposed in pairs separated transversely along the front auger structures 38, 39. The upper sides of the housing structure over the front augers 38, 39 are open between the respective pairs of brackets to provide material inlets 52. The inlets 52 on the front conveyors are so disposed that two of them are outwardly of the front traction wheels 13, 14 and two are inwardly thereof.

Figure 1:
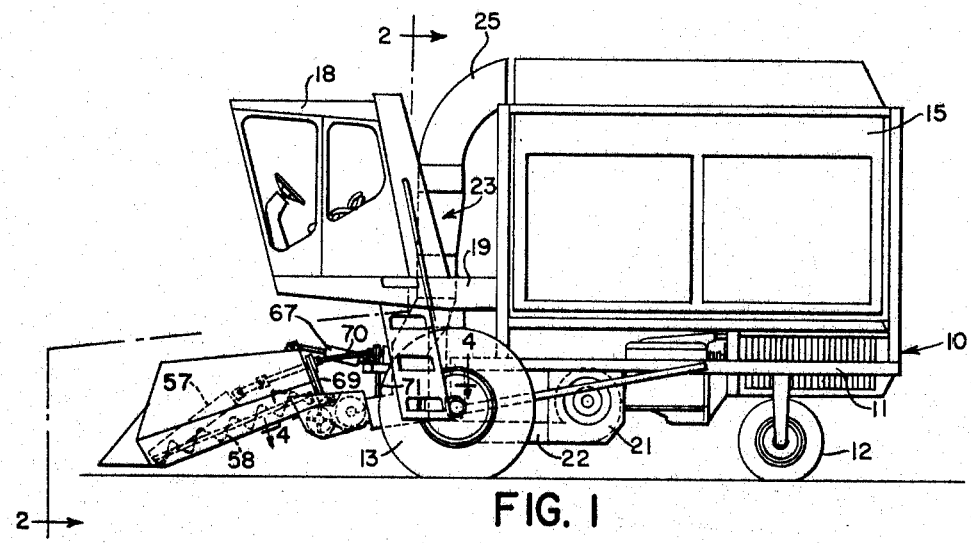
FIG. 1 is a side view of the cotton harvester.

Positioned forwardly and aligned with the respective inlets 52 are a plurality of harvesting row units 53, 54, 55 and 56. Each row unit has harvesting roll means, as shown in dotted representation at 57 in FIG. 1, and side discharge augers 58 that move the harvested cotton rearwardly to the rear end of the respective row units. The row units 53, 56 are positioned forwardly of the outer inlets 52 and consequently are outward of the respective traction wheels 13, 14. Each row unit also has vertical fore-and-aft extending side panels, such as is shown at 59, transversely spaced apart and disposed just inwardly of the respective brackets 51 defining the opposite sides of the respective inlets 52. The panels 59 carry thereon rearwardly projecting brackets 60 that extend alongside the respective brackets 51 and are pivotally connected thereto by pins 61 extending through both brackets 51. Consequently, each of the row units 53, 56 may be adjusted vertically on the respective pivot pins 61. Supported on the main frame 11 and rearwardly of the rear traction wheels 13, 14 is a transverse beam 65 that extends across the forward side of the tractor and just forwardly of the respective traction wheels 13, 14. Provided on the beam 65 are upwardly projecting brackets 66 that carry extensible and retractable hydraulic motors 67, the latter having their rod ends 68 connected to the respective row units 53–56. The extensible and retractable motors 67 may be utilized to raise and lower the respective row units 53–56. Suitable belt drives, shown at 69 are provided on each row unit. The drive units 69 are driven by suitable drive shafts 70 driven by belt drives 71 drivingly connected to the belt pulley 20. The shafts 70 telescope to accommodate vertical movement of the respective row units 53–56.

In operation, the entire harvester is moved over the cotton field and the respective row units 53–56 operate to harvest four adjacent rows of cotton plants. The harvesting rolls 57 remove the cotton bolls, both ripe and green, and discharge them into the side conveyors 58 which move the bolls rearwardly to a rear discharge end above the forward transverse augers 38, 39. Paddle means 75 are provided on the rear portion of the augers 58 and serves to drive the cotton bolls downwardly through the inlets 52 and into the auger troughs 40, 41. Reviewing FIG. 4, it will be noted that the augers 38, 39 are of opposite hand and operate to drive the cotton bolls first outwardly toward the outer ends of the auger troughs 40, 41. Since the auger troughs 40, 41 are grilled, trash accumulated with the cotton during the harvesting is permitted to pass downwardly and away from the housing. The cotton bolls are then driven rearwardly by the paddles 45, 46 for discharge into the rear transverse conveyor structure 42. The augers 43, 44 drive the cotton inwardly from the outer ends and over the grilled under portion of the troughs 47, 48. Additional trash may be discharged when so conveying the cotton bolls. Upon the cotton bolls reaching the central or inner portions of the respective augers 43, 44 there are provided paddle means 76, 77 that drive the cotton bolls into the forwardly opening portions 32, 34 of the discharge ducts 23, 24. Air will be driven into the main or vertical portions of the respective discharge ducts 23, 24 at a relatively high rate of discharge and toward the top of the respective ducts. This in effect creates a vacuum or suction in the portion 31 and 32, and the vacuum draws the ripened cotton bolls upwardly through the ducts 23, 24 for discharge into the container 15.

What is claimed is:

1. A cotton harvesting implement composed of a tractor having a pair of forward transversely spaced traction wheels; a transverse main supporting beam carried on the tractor forwardly of the wheels and having a transverse expanse greater than the wheels; a plurality of transversely spaced cotton harvester units pivotally supported for vertical movement on the tractor and forwardly thereof both inwardly and outwardly of the traction wheels, each of the units having a conveyance means for moving cotton rearwardly to a rear discharge end; transverse conveying means supported on the tractor rearwardly of the harvesting units composed of a first transverse conveyor structure adapted to receive cotton from the discharge ends of the respective units and to move the cotton outwardly to transversely spaced opposite ends, and a second transverse conveyor structure adapted to receive the cotton from the respective ends of the first conveyor structure and to move the cotton inwardly to a central discharge area; a cotton retaining and collecting device supported on the tractor; a blower supported on the tractor adapted to convey cotton from the discharge area into the container; and hydraulic means between the transverse beam and the respective harvesting units for raising and lowering the units.

2. A cotton harvesting implement composed of a tractor having a pair of forward transversely spaced traction wheels; a plurality of transversely spaced cotton harvester units pivotally supported for vertical movement on the tractor and forwardly thereof both inwardly and outwardly of the traction wheels, each of the units having a conveyance means for moving cotton rearwardly to a rear discharge end; transverse conveying means supported on the tractor rearwardly of the harvesting units composed of a first transverse conveyor structure adapted to receive cotton from the discharge ends of the respective units and to move the cotton outwardly to transversely spaced opposite ends, and a second transverse conveyor structure adapted to receive the cotton from the respective ends of the first conveyor structure and to move the cotton inwardly to a central discharge area; a cotton retaining and collecting device supported on the tractor; and means supported on the tractor adapted to convey cotton from the discharge area into the container.

3. A cotton harvesting implement composed of a tractor; a plurality of transversely spaced cotton harvester units pivotally supported for vertical movement on the tractor and forwardly thereof, each of the units having a conveyance means for moving cotton rearwardly to a rear discharge end; transverse conveying means supported on the tractor rearwardly of the harvesting units composed of a first transverse conveyor structure adapted to receive cotton from the discharge ends of the respective units and to move the cotton outwardly to outer ends, and a second transverse conveyor structure adapted to receive the cotton from the respective ends of the first conveyor structure and to move the cotton inwardly to a central discharge area; a cotton retaining and collecting device supported on the tractor; and means supported on the tractor adapted to convey cotton from the discharge area into the container.

4. The structure as set forth in claim 3 in which the first conveyor structure is composed of a transverse auger trough means extending across the forward end of the tractor and having aligned auger flights seated therein with inner ends adjacent the fore-and-aft center line of the implement and adapted to drive the cotton outwardly to the respective outer ends.

5. The structure as set forth in claim 4 in which the auger trough means has a grilled underside to permit trash to exit as the cotton is moved over it.

6. The structure as set forth in claim 4 in which the second conveyor structure is an auger trough means adjacent to and alongside the auger trough means of the first conveyor structure and has aligned auger flights adapted to move cotton from the outer ends inwardly to the discharge area at the central portion of the implement.

7. The structure as set forth in claim 6 in which the auger trough means of the second auger structure has a grilled underside for permitting trash to move therethrough as the respective auger flights move the cotton inwardly.

8. The structure as set forth in claim 6 in which the auger trough means of both the conveyor structures is grilled to permit trash to be discharged as the respective auger flights move the cotton therealong.

9. The structure as set forth in claim 3 further characterized by the first conveyor structure having vertical bracket structure thereon and the respective harvesting units are pivotally supported on the tractor by transverse pivot structure connected to the brackets.

10. The structure as set forth in claim 9 further characterized by the tractor having transversely spaced forward traction wheels, there are harvesting units both inboard and outboard of the traction wheels, the first and second conveyors extend across the forward side of the wheels and have opposite ends outwardly of the wheels; a transverse beam forwardly of the tractor wheels rigidly supported on the tractor; and hydraulic motors extending between the beam and the harvesting units for vertically adjusting the units.

11. The structure as set forth in claim 3 in which the means adapted to convey cotton from the discharge area into the container includes a pair of separated vertical ducts adapted to convey cotton from respective harvesting units on opposite sides respectively of the fore-and-aft center portion of the tractor, the ducts having lower ends at the discharge of the second conveyor means and upper ends discharging into the container; and in which the first conveyor structure is a pair of transversely aligned transverse conveyors receiving cotton from the respective discharge ends of the aforesaid harvesting units on opposite sides of the fore-and-aft center portion of the tractor; and the second transverse conveyor structure is a pair of transversely aligned transverse conveyors alongside the respective conveyors of the first conveyor structure and adapted to move cotton inwardly for discharge into the respective lower ends of the ducts.

12. A cotton harvester implement composed of a tractor having forward traction wheels; a cotton container suspended on the tractor; a pair of vertical ducts forward of the tractor opening into the upper portion of the container and having lower adjacent intake ends between the traction wheels; a grouping of a plurality of harvesting units extending outwardly from an inner unit adjacent and forwardly of each of the respective intake ends to an outer unit forwardly and outwardly of the respective traction wheels; a transverse conveying structure behind each grouping of units with each conveying structure being composed of first and second transverse conveyors with the first conveyor adapted to receive cotton from the respective units in the grouping and to move the cotton outwardly to an outer end beyond the traction wheel, the second transverse conveyor being adapted to move the cotton inwardly to an end discharging cotton into the lower intake end of one of the ducts, and transferring means for moving cotton from the outer end of the first conveyors to the second conveyors.

13. The structure as set forth in claim 12 in which the first and second conveyors are auger conveyors and the auger troughs are grilled to permit trash to be discharged as the cotton is conveyed.

14. The structure as set forth in claim 13 in which the transferring means is a paddle at and operative to rotate with the end of the transverse auger of the first conveyor and for shifting cotton to the second conveyor.

15. A cotton harvesting implement composed of a tractor; a plurality of transversely spaced cotton harvester units pivotally supported for vertical movement on the tractor and forwardly thereof, each of the units having a conveyance means for moving cotton rearwardly to a rear discharge end; transverse conveying means supported on the tractor rearwardly of the harvesting units composed of a first transverse conveyor structure adapted to receive cotton from the discharge ends of the respective units and a second transverse conveyor structure adapted to receive the cotton from the first conveyor structure and to move the cotton to a discharge area, at least one of the conveyor structures having a transverse section for removing trash from the cotton, and the first and second conveyor structures move cotton in opposite transverse directions respectively; a cotton retaining and collecting device supported on the tractor; and means supported on the tractor adapted to convey cotton from the discharge area into the container.

References Cited

UNITED STATES PATENTS

| | | | |
|---|---|---|---|
| 1,885,437 | 11/1932 | Harazin | 56—30 XR |
| 2,001,079 | 5/1935 | Court | 56—14 |
| 2,355,880 | 8/1944 | Macha | 56—40 |
| 2,406,058 | 8/1946 | Boone | 56—33 |
| 2,451,130 | 10/1948 | Townsend | 56—14 |
| 2,571,224 | 10/1951 | Edwards | 56—14 |
| 2,654,201 | 10/1953 | Hyman | 56—29 |
| 2,903,835 | 9/1959 | Kappelmann | 56—33 |
| 3,171,241 | 3/1965 | Streb | 56—33 |

RUSSELL R. KINSEY, Primary Examiner

U.S. Cl. X.R.

56—33